(12) United States Patent
Uchida et al.

(10) Patent No.: US 7,802,190 B2
(45) Date of Patent: Sep. 21, 2010

(54) APPLICATION DISPLAY APPARATUS AND APPLICATION DISPLAY SYSTEM

(75) Inventors: Koichi Uchida, Saitama (JP); Hiroyuki Arakawa, Tochigi (JP)

(73) Assignee: Sony Corporation, Tokyo (JP)

( * ) Notice: Subject to any disclaimer, the term of this patent is extended or adjusted under 35 U.S.C. 154(b) by 945 days.

(21) Appl. No.: 10/990,504

(22) Filed: Nov. 18, 2004

(65) Prior Publication Data

US 2005/0132361 A1 Jun. 16, 2005

(30) Foreign Application Priority Data

Dec. 1, 2003 (JP) .............................. P2003-401406

(51) Int. Cl.
*G06F 15/177* (2006.01)
*G06F 3/00* (2006.01)
*G06F 3/048* (2006.01)
*G06F 15/16* (2006.01)

(52) U.S. Cl. ................... 715/737; 715/739; 715/740; 715/810; 715/826; 715/855; 709/203

(58) Field of Classification Search ............ 715/737, 715/739, 740, 810, 826, 855, 906, 526; 345/513
See application file for complete search history.

(56) References Cited

U.S. PATENT DOCUMENTS

| | | | | |
|---|---|---|---|---|
| 5,711,672 | A * | 1/1998 | Redford et al. | 434/307 R |
| 5,867,714 | A * | 2/1999 | Todd et al. | 717/172 |
| 5,951,639 | A * | 9/1999 | MacInnis | 725/70 |
| 6,182,094 | B1 * | 1/2001 | Humpleman et al. | 715/513 |
| 6,288,716 | B1 * | 9/2001 | Humpleman et al. | 715/733 |
| 6,332,219 | B1 * | 12/2001 | Curtis et al. | 717/170 |
| 6,507,325 | B2 * | 1/2003 | Matz et al. | 343/878 |
| 6,642,943 | B1 * | 11/2003 | Machida | 715/763 |
| 6,690,392 | B1 * | 2/2004 | Wugoski | 715/744 |
| 7,046,280 | B1 * | 5/2006 | Niikawa | 348/231.9 |
| 7,376,913 | B1 * | 5/2008 | Fleck et al. | 715/864 |
| 7,493,378 | B2 * | 2/2009 | Kawashima | 709/223 |
| 7,536,698 | B2 * | 5/2009 | Machida | 719/321 |

(Continued)

FOREIGN PATENT DOCUMENTS

EP 0 264 199 A1 4/1988

(Continued)

OTHER PUBLICATIONS

European Search Report dated Apr. 27, 2005.

(Continued)

*Primary Examiner*—Dennis-Doon Chow
*Assistant Examiner*—Linh K Pham
(74) *Attorney, Agent, or Firm*—Rader, Fishman & Grauer PLLC

(57) ABSTRACT

Apparatus and method for displaying menu lists and activating applications in conjunction with electronic devices that respectively load contents and an information device that reproduces the contents stored in the electronic devices. Connection to the electronic devices is detected, and a menu list is generated. The menu list automatically updates to include additional applications corresponding to electronic devices when connections to the electronic devices are respectively detected. This provides an updated menu list from which selection is made to activate a predetermined application to perform an operation related to the relevant electronic device.

19 Claims, 7 Drawing Sheets

U.S. PATENT DOCUMENTS

| | | | |
|---|---|---|---|
| 2002/0004855 A1* | 1/2002 | Cox et al. | 709/328 |
| 2002/0039115 A1* | 4/2002 | Kawashima | 345/810 |
| 2002/0051083 A1* | 5/2002 | Aratani et al. | 348/554 |
| 2002/0063736 A1* | 5/2002 | Sugimoto | 345/762 |
| 2002/0083228 A1* | 6/2002 | Chiloyan et al. | 710/9 |
| 2002/0095501 A1* | 7/2002 | Chiloyan et al. | 709/227 |
| 2002/0095527 A1* | 7/2002 | Shizuka et al. | 709/327 |
| 2002/0103860 A1* | 8/2002 | Terada et al. | 709/203 |
| 2003/0184580 A1* | 10/2003 | Kodosky et al. | 345/734 |
| 2003/0184596 A1* | 10/2003 | Kodosky et al. | 345/810 |
| 2003/0225933 A1* | 12/2003 | Suzuki | 709/321 |
| 2003/0227641 A1* | 12/2003 | Edmonds et al. | 358/1.13 |
| 2003/0233488 A1* | 12/2003 | Ozaki et al. | 709/321 |
| 2004/0015956 A1* | 1/2004 | Barfield et al. | 717/174 |
| 2004/0088372 A1* | 5/2004 | Sivaraman et al. | 709/217 |
| 2005/0132361 A1* | 6/2005 | Uchida et al. | 717/178 |

FOREIGN PATENT DOCUMENTS

| | | | |
|---|---|---|---|
| EP | 0 602 947 A1 | | 6/1994 |
| EP | 1 182 545 A2 | | 2/2002 |
| EP | 1 221 652 A2 | | 7/2002 |
| JP | 63-198443 | | 8/1988 |
| JP | 04042003 A | * | 2/1992 |
| JP | 08-234991 A | | 9/1996 |
| JP | 2000-010905 A | | 1/2000 |
| JP | 2000-347839 A | | 12/2000 |
| JP | 2003-099262 A | | 4/2003 |
| JP | 2003099262 A | * | 4/2003 |
| JP | 2003-196224 A | | 7/2003 |
| JP | 2003196224 A | * | 7/2003 |

OTHER PUBLICATIONS

Japanese Office Action issued Jan. 5, 2010 for corresponding Japanese Application No. 2003-401406.

* cited by examiner

| SMALL CLASSIFICATION (DEVICE NAME) | MEDIUM CLASSIFICATION (SET FLAG NAME) |
|---|---|
| xxxx DCR-TRV20 | ILINK_CAM |
| xxxx DCR-TRV30 | |
| xxxx DCR-PC120 | |
| VID 054C&PID 0010 | MS DSC |

SCREEN 1

SCREEN 2

SCREEN 3

SCREEN 4

SCREEN 5

SCREEN 6

SCREEN 7

APPLICATION DISPLAY APPARATUS AND APPLICATION DISPLAY SYSTEM

CROSS REFERENCE TO RELATED APPLICATION

The present document is based on Japanese Priority Document JP2003-401406, filed in the Japanese Patent Office on Dec. 1, 2003, the entire contents of which are incorporated herein by reference.

BACKGROUND OF THE INVENTION

1. Field of the Invention

The present invention relates to an application display apparatus and more specifically, to an application display apparatus constructed to display a menu list and activate only an application (program) corresponding to an electronic device connected to an information device from among the applications installed from an information medium, such as a CD-ROM, provided with applications usable for a plurality of connectable electronic devices.

2. Description of Related Art

In a related art, it is well known that an information medium such as a CD-ROM is loaded into a computer which serves as an information device, and a desired application is installed so that a desired electronic device is driven by activating the installed application, or so that contents stored in the electronic device are loaded to enable playback, edit or the like. In addition, in many cases, software which is dependent on a particular device, cannot be used by the user nor fully serve its function if a user does not have the device.

In addition, monitoring the connection state of a particular electronic device and switching display control of software according to the state are also conceivable.

[Patent Document 1] Japanese Patent Application Publication No. SHO63-198443 (Page 2, FIG. 1)

lso conceivable. [Patent Document 1] Japanese Patent Application Publication No. SHO63-198443 (Page 2, FIG. 1) on No. SHO63-198443 (Page 2, FIG. 1)

SUMMARY OF THE INVENTION

However, the computer into which to install an application for driving an electronic device as described in the related art has the problem that an application corresponding to the electronic device needs to be installed in advance, and selecting an application to be installed is complicated. In addition, in the case where there are applications for a plurality of electronic devices, some of which can be used in common with the electronic devices, and the others of which can be used for some devices but not for other devices, because of the features of the individual electronic devices, various CD-ROMs to be given to users need to be prepared in different combinations according to individual electronic devices.

Accordingly, since a plurality of CD-ROMs need to be prepared for individual devices, there is the problem that management becomes complicated.

In view of the above circumstances, the present invention provides a method and an apparatus both of which can automatically select an application according to a particular electronic device without the need to cause a user to select the application for driving the particular electronic device.

An application display apparatus according to the invention of the present application has the following construction.

(1) An application display apparatus includes a connection terminal to which an electronic device provided with means for loading the contents is connected, and the application display apparatus is an information device provided with a function for reproducing the contents stored in the electronic device by installing applications stored in an information medium; wherein the information device has a function for detecting connection to the electronic device, a function for displaying a menu list for activating only an application corresponding to the electronic device connected to the information device; and a function for activating a predetermined application by selecting a desired operation from the list of menu.

(2) The application display apparatus as in (1) is characterized in that the function for detecting a connection to the electronic device is provided with memory means for storing and saving device information on the connected electronic device.

(3) The application display apparatus as in (2) is characterized in that the memory means stores only device information on a predetermined particular electronic device.

(4) The application display apparatus as in (3) is characterized in that the predetermined particular electronic device is changeable with other appropriate devices.

(5) The application display apparatus as in (1) is characterized in that the menu includes a menu for activating an application corresponding to a previously detected electronic device on the basis of the function for detecting the connection to the electronic device.

(6) The application display apparatus as in (1) is characterized in that the electronic device is an image pickup device.

(7) An application display system includes an electronic device having means for loading contents and an information device having a function for reproducing the contents stored in the electronic device by installing applications stored in an information medium, wherein the information device has a function for detecting a connection to the electronic device, a function for displaying a menu list for activating only an application corresponding to the electronic device connected to the information device, and a function for activating a predetermined application by selecting a desired operation from the menu list.

As described above, in accordance with the present invention, since the application display apparatus is constructed to detect an electronic device connected to a computer and display a menu list for only an application corresponding to a particular electronic device, a user does not need to select the relationship between the particular electronic device and the application corresponding to that particular electronic device, and thereby the user can be prevented from being confused prior to operation. In addition, the application display apparatus has the advantage that since applications corresponding to various devices can be recorded on an information medium such as one CD-ROM, it is possible to promote cost reductions through mass production as well as simplification of management.

DESCRIPTION OF THE PREFERRED EMBODIMENTS

An embodiment of an application display apparatus according to the invention of the present application will be described below with reference to the accompanying drawings.

Figure 1:
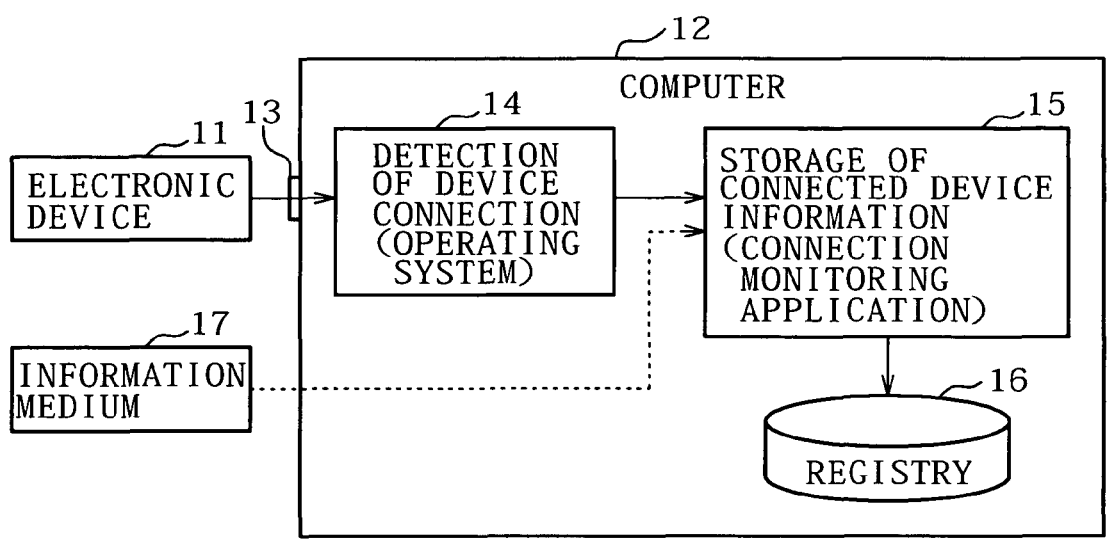
FIG. 1 is a block diagram schematically showing an application display apparatus according to the present invention.

The application display apparatus according to the invention of the present application includes, as shown in FIG. 1, a CD-ROM 17 which is an information medium provided with applications for driving an electronic device 11, a computer 12 which is an information device provided with a function capable of installing and executing applications recorded on this CD-ROM 17, and an electronic device 11 from which its contents can be loaded. The information medium is not limited to a CD-ROM and may be any other kind of information medium. In addition, if the computer is provided with a communication function, the computer of course may be constructed to download a desired application via a particular network. The electronic device 11 herein includes image pickup devices, such as video cameras, and is constructed having recording means for recording video images. The computer 12 is at least provided with a function 14 for detecting connection to an electronic device; a function 15 for displaying a menu list for activating only an application corresponding to an electronic device connected to the computer 12; a function for activating a predetermined application by selecting a desired operation from the menu list displayed; and a registry 16 which is a memory means for storing and saving device information on the electronic device detected on the basis of the function 14 for detecting a connection to an electronic device.

The function 14 for detecting a connection to an electronic device acquires device information from the connected electronic device 11 when the electronic device 11 is connected to a connection terminal 13 provided on the computer 12. This function is constructed to be driven in the operating system (OS) of the computer.

The function 15 for displaying a menu list activates a connection monitoring application for storing information on the connected electronic device 11, and identifies the device on the basis of the acquired device information on the electronic device by means of the function 14 for detecting a connection to the electronic device 11. This acquired device information is stored into the registry 16, and the function 15 displays a menu list so as to activate only an application which will become necessary for the identified electronic device 11 at a later operation.

The function for initiating a predetermined application by selecting a desired operation from the menu list initiates, on the basis of the function 15 for displaying a menu list, an application related to the electronic device identified. When the operation of selecting a desired item from the menu list is carried out, the function activates a particular application so that various operations related to the particular electronic device can be performed.

Figure 2:
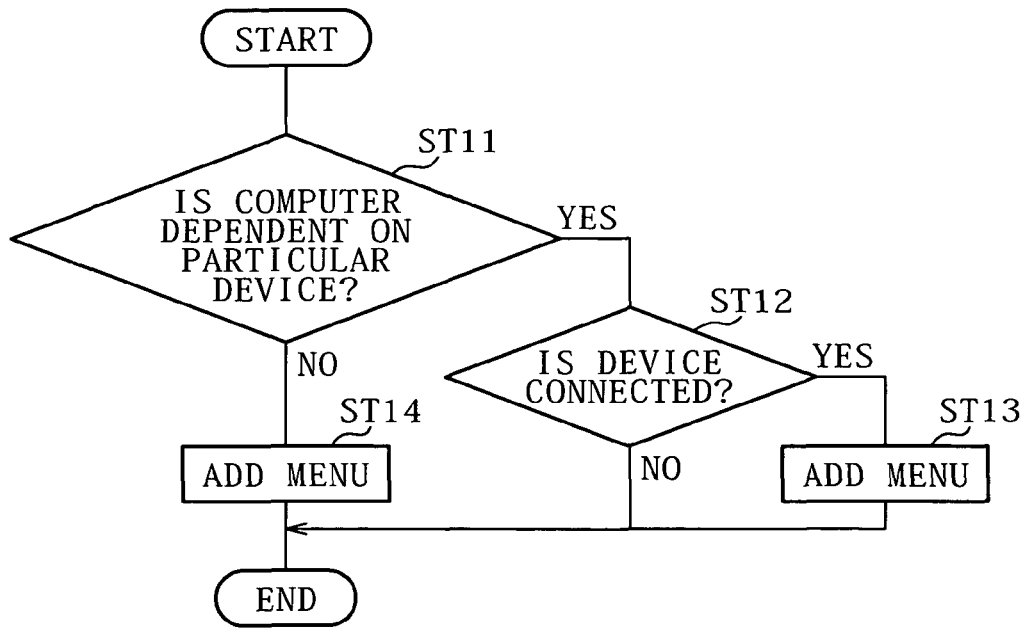
FIG. 2 is a flowchart showing the operation of the application display apparatus.

The operation of the application display apparatus having this construction will be described with reference to the flowchart shown in FIG. 2.

During the state in which the applications stored in the CD-ROM 17, which is an information medium, are installed in the computer 12, if the computer 12 is not dependent on the particular electronic device 11, a menu for an electronic device related to the installed applications is added and displayed (Steps ST11 and ST14). If the computer 12 is dependent on the particular electronic device in Step ST11, when the particular electronic device is connected to the computer 12, a menu for an application related to the connected electronic device 11 is added and displayed (Steps ST11, ST12 and ST13). If the electronic device 11 is not connected to the computer 12 in Step ST12, the current menu remains displayed.

In this manner, after the applications stored in the information medium have been installed into the computer 12, when the electronic device 11 is connected to the connection terminal 13, the computer 12 identifies the electronic device 11 from information on the connected device and automatically selects an application related to the identified electronic device 11 and displays a menu list. Namely, this menu list displays only the application to be used in the particular electronic device 11, but does not display applications related to other kinds of electronic devices 11. Accordingly, not only is a user prevented from performing an erroneous operation, but the user also can be prevented from being confused prior to operation by hiding an application of an electronic device which is unusable because the user does not have a particular electronic device 11. This fact means that once the electronic device 11 is connected to the computer 12, the computer 12 regards the user as having the electronic device 11 and permits the user to use an application related to the electronic device 11 after that time.

Accordingly, a plurality of applications related to a plurality of electronic devices 11 are recorded on the single CD-ROM (information medium) 17, and the user has only to install the applications from the CD-ROM (information medium) 17 so that if a particular electronic device was connected to the computer 12 in the past, a menu related to the particular electronic device can be displayed in a list view on the basis of device information stored and saved in the computer 12. As a result, the user does not need to select and install an information medium related to a particular electronic device 11, and the computer 12 automatically selects the application necessary for the particular electronic device 11.

Next, how displayed menu contents are modified according to the kind of electronic device 11 connected to the computer 12 is described below.

Figure 7:
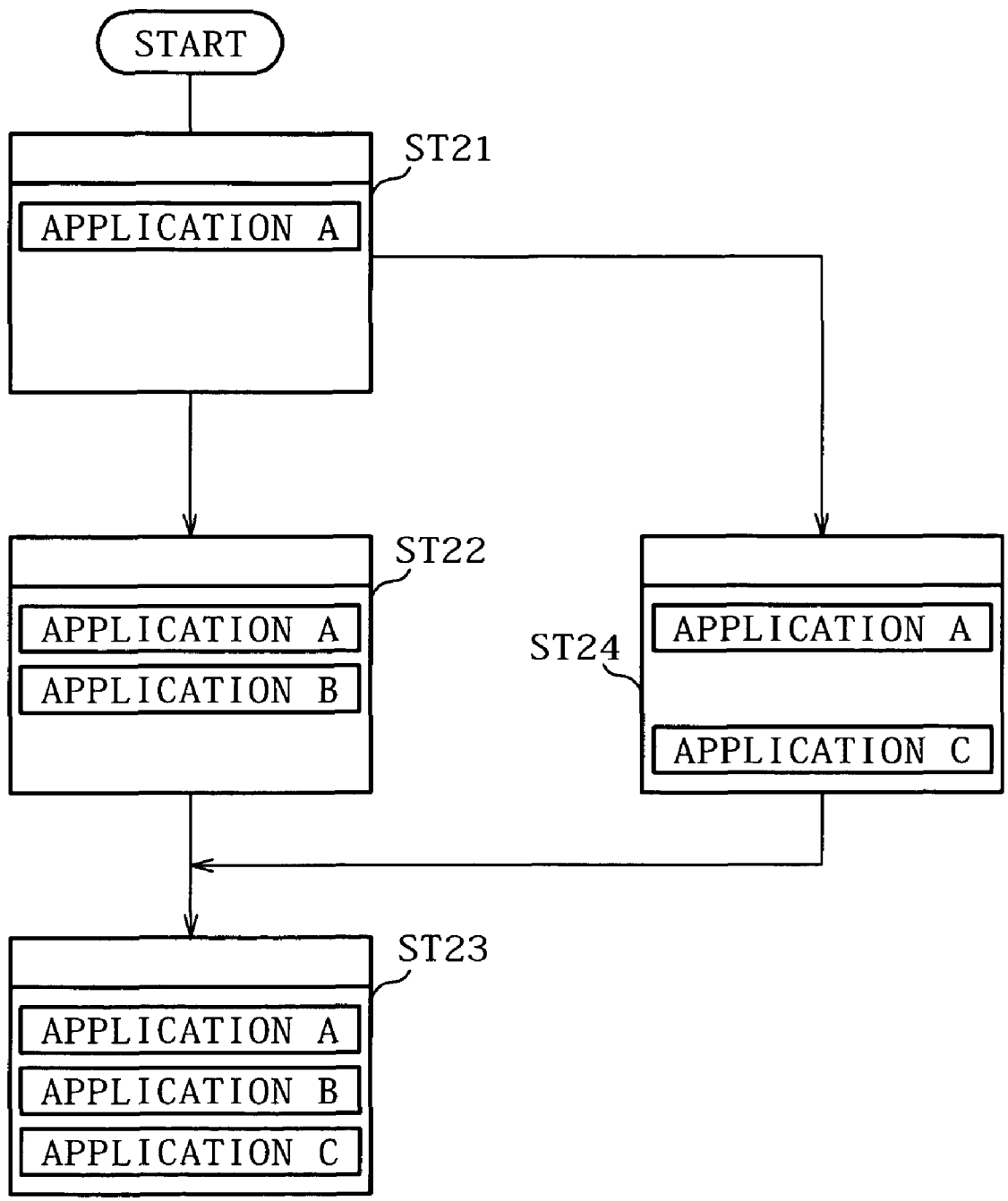
FIG. 7 is a flowchart showing the transition state of applications in the application display apparatus.

First of all, the user installs applications into the computer 12. In the following description, by way of example, three applications are assumed to be installed, and reference is made to the flowchart shown in FIG. 7. It is assumed here that an application A is an application which is not dependent on a particular electronic device 11, an application B is an application which the user cannot use if the user does not have an electronic device D1, and an application C is an application which the user cannot use if the user does not have an electronic device D2.

Figure 3:
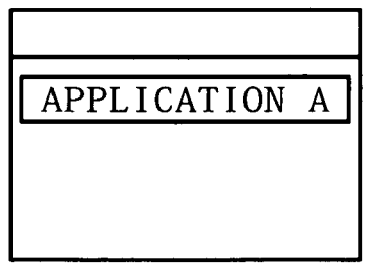
FIG. 3 is an explanatory view showing the state of an application in the application display apparatus.

(Pr1) After the above-mentioned applications have been installed into the computer 12, when the menu is activated, only the application A which is not dependent on a particular electronic device 11 is displayed as shown in FIG. 3 (Step ST21).

Figure 4:
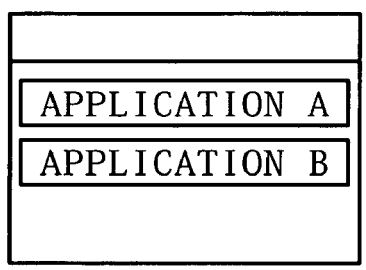
FIG. 4 is an explanatory view showing the state of applications in the application display apparatus.

(Pr2) Then, when the menu is activated after the electronic device D1 has been connected, two applications, i.e., the application A which is not dependent on a particular electronic device 11 and the application B which the user cannot use if the user does not have the electronic device D1, are displayed as shown in FIG. 4 (Step ST22).

Figure 5:
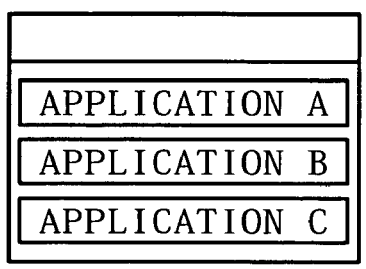
FIG. 5 is an explanatory view showing the state of applications in the application display apparatus.

(Pr3) Furthermore, when the menu is activated after the electronic device D2 has been connected, three applications, i.e., the application A which is not dependent on a particular electronic device 11, the application B which the user cannot use if the user does not have the electronic device D1, and the application C which the user cannot use if the user does not have the electronic device D2, are displayed as shown in FIG. 5. At this time, the display of the applications do not depend on whether the electronic device D1 is connected or unconnected (Step ST23).

Figure 6:
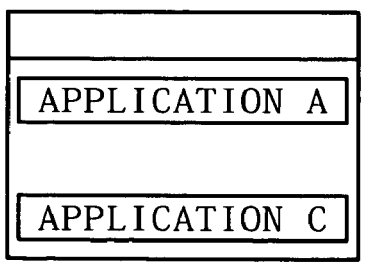
FIG. 6 is an explanatory view showing the state of applications in the application display apparatus.

(Pr4) After the processing (Pr1), when the menu is activated after the electronic device D2 has been connected, two applications, i.e., the application A which is not dependent on a particular electronic device 11 and the application C which the user cannot use if the user does not have the electronic device D2, are displayed as shown in FIG. 6 (Step ST24).

(Pr5) After the processing (Pr4), when the menu is activated after the electronic device D1 has been connected, three applications similar to those mentioned in the processing (Pr3), i.e., the application A which is not dependent on a particular electronic device 11, the application B which the user cannot use if the user does not have the electronic device D1, and the application C which the user cannot use if the user does not have the electronic device D2, are displayed as shown in FIG. 5 (Steps ST24 and ST23).

Menu contents that are actually displayed on the screen of a personal computer when the personal computer is an information device and a video camera is an electronic device, as a specific example, will be described below. First of all, a CD-ROM which is an information medium related to the video camera is loaded with the personal computer, and applications containing an application related to the video camera are installed.

Figure 8:
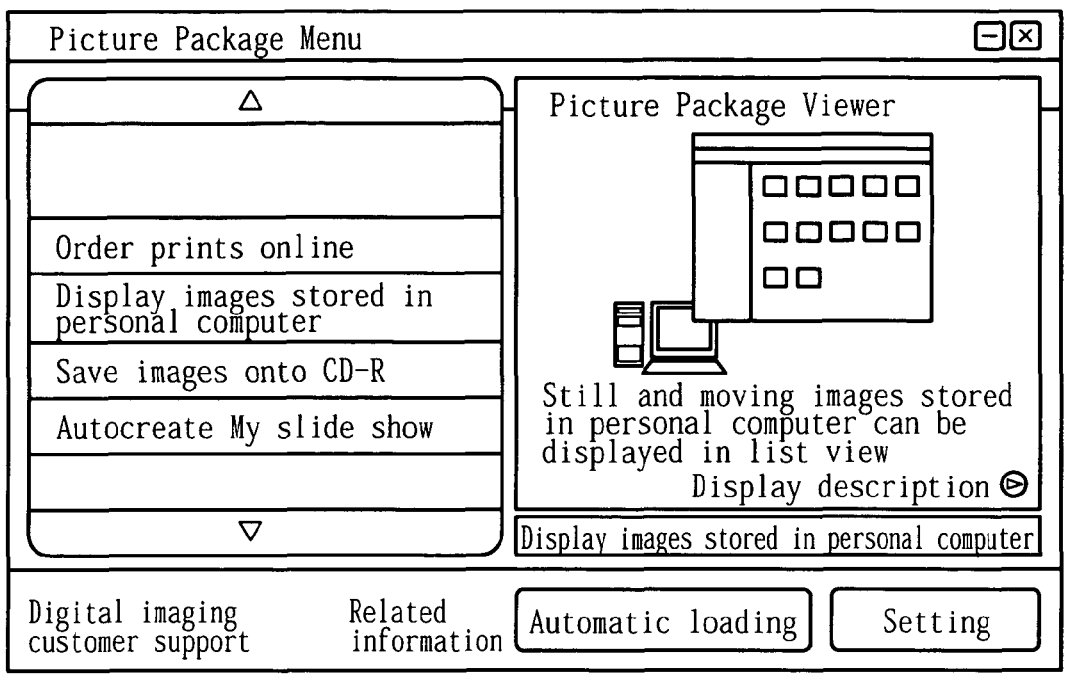
FIG. 8 is an explanatory view showing a menu screen to be displayed by the application display apparatus when an actual application is activated.

When the menu is activated immediately after the applications have been installed, four executable applications are displayed as shown in FIG. 8. The four applications, i.e., <1> Order prints online, <2> Display images stored in personal computer, <3> Save images onto CD-R and <4> Autocreate My slide show, are displayed in the form of a menu list. These applications are displayed in a list view so that versatile applications which can be used for all connectable electronic devices can be activated.

Figure 9:
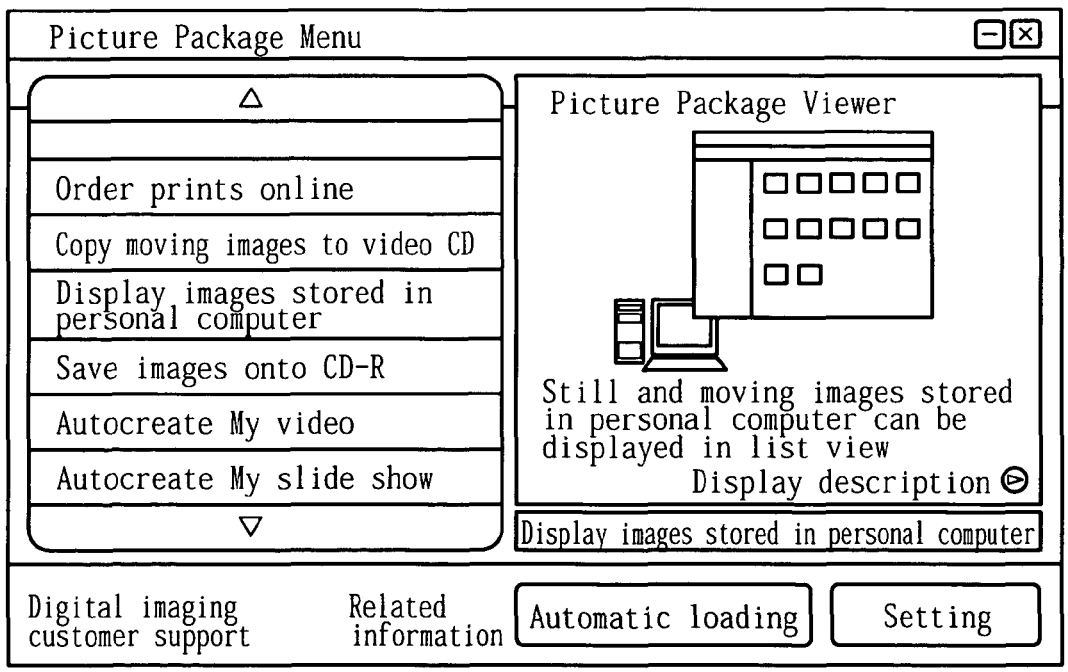
FIG. 9 is an explanatory view showing a menu screen to be displayed by the application display apparatus when an electronic device is actually connected and an increased number of applications can be activated.

Then, after the video camera has been connected during this state, when the menu is activated, six executable applications are displayed as shown in FIG. 9. The six applications, i.e., <1> Order prints online, <2> Copy moving images to video CD, <3> Display images stored in personal computer, <4> Save images onto CD-R, <5> Autocreate My video and <6> Autocreate My slide show, are displayed in the form of a menu list. In this manner, when the video camera is connected to the personal computer, applications dedicated to the video camera, in this case, <2> Copy moving images to video CD and <5> Autocreate My video are additionally displayed the list of menu list.

Then, the computer 12 refers to particular flags stored in the registry 16 for the purpose of controlling the menu display. Processing to be performed from the connection of the particular electronic device 11 until the completion of flag setting will be described below with reference to the corresponding drawings.

<1> First, when an electronic device is connected, a notice (WM_DEVICECHANGE) indicating this connection is issued from the OS (Windows (R)). The connection monitoring application executes the following processing by using this notice as a trigger.

<2> The connected electronic device is identified.

Figure 10:
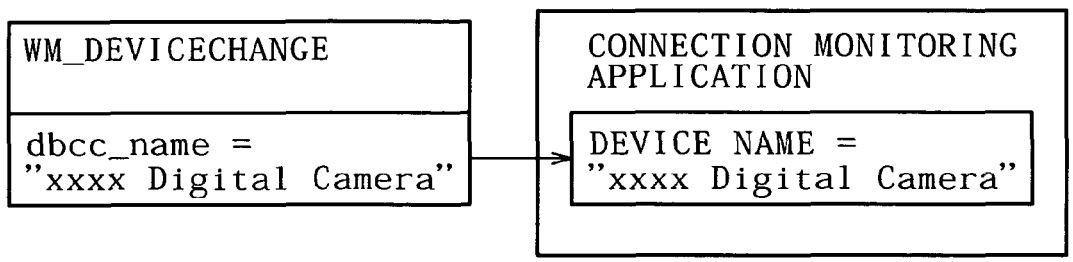
FIG. 10 is an explanatory view of a first method for detecting a connected device and setting the device name thereof in the application display apparatus.

To identify this electronic device, the following three kinds of methods are used on the basis of information contained in the notice (WM_DEVICECHANGE). The first method uses values contained in the notice, such as PID, Device and Descriptor, etc., as a device name as shown in FIG. 10. In the case of the embodiment, information "XXXX Digital Camera" is used as a device name.

Figure 11:
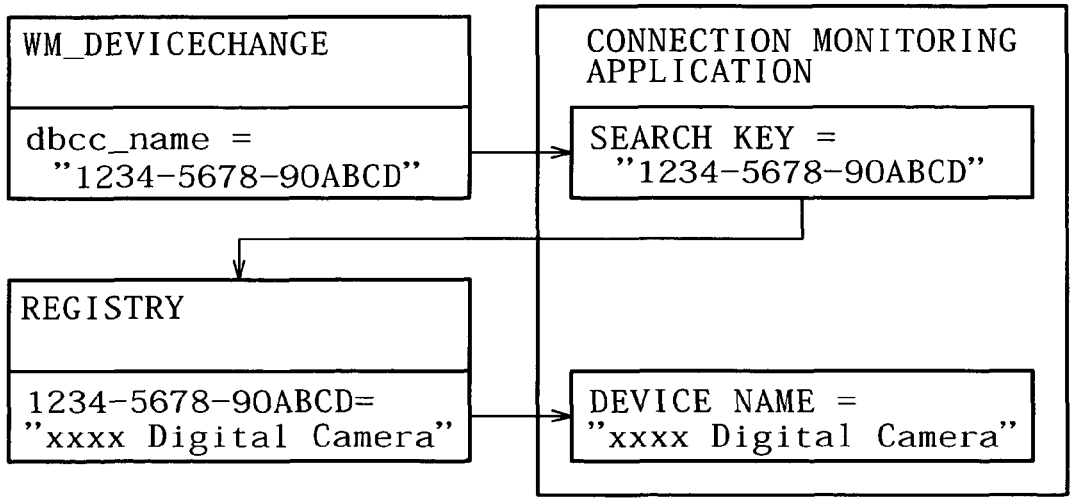
FIG. 11 is an explanatory view of a second method for detecting a connected device and setting the device name thereof in the application display apparatus.

The second method, as shown in FIG. 11, uses as a key a value contained in the notice, and uses a value derived from this key as a device name. In the case of the embodiment, information "1234-5678-90ABCD" contained in the notice is used as a search key, and "XXXX Digital Camera", which is searched with the search key "1234-5678-90ABCD" existing in the registry 16, is used as a device name.

Figures 12, 13:
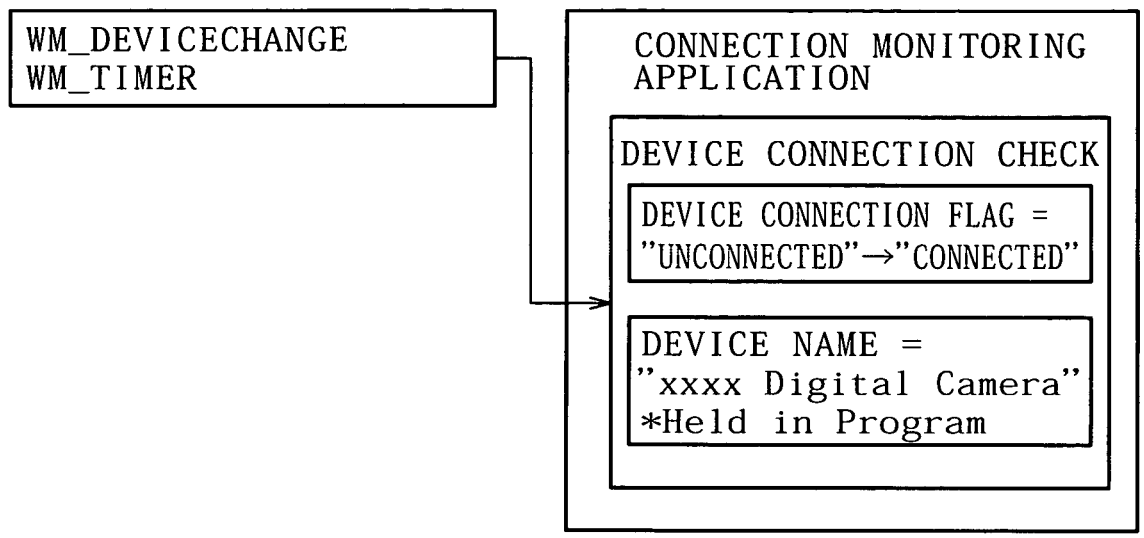
FIG. 12 is an explanatory view of a third method for detecting a connected device and setting the device name thereof in the application display apparatus.
FIG. 13 is an explanatory view showing in a table view an example in which a small-classification device name is set to a large-classification device name in the application display apparatus.

The third method, as shown in FIG. 12, does not use the value of information contained in the notice, and it internally has a connection state flag for an electronic device and determines whether an unconnected state has changed to a connected state, thereby identifying the electronic device. In this case, it is assumed that the device name is known in advance. In the embodiment, when the notice is detected, the device connection flag is changed from an unconnected flag to a connected flag, and the device name is set to "XXXX Digital Camera". This device name is held in the application.

In this manner, the identification of the connected device is performed. Then, the configured device name is extracted to make a distinction between the manufacturing company of the device and the other companies. There are two techniques for this distinction. The first technique uses a table and extracts only device information described in this table. The second technique extracts only device information in which a particular character string (such as "XXXX") is contained in a device name. This "XXXX" is a logo, such as a company name.

Then, if the identified device name belongs to a classification too small to be handled, a name corresponding to a medium classification is newly assigned. Specifically, as shown in FIG. 13, if the device name belongs to a small classification, for example, in the case of "XXXX DCR-TRV20", "XXXX DCR-TRV30" or "XXXX DCR-PC120", the configured flag name "ILINK_CAM" is assigned as a medium classification so that the device name can be easily handled. On the other hand, if the device name belongs to a small classification labeled "VID 054C&PID 0010", the device name "MS DSC" belonging to the medium classification is newly assigned, whereby the device is classified by function so that it can be easily classified.

After the device name has been changed to a device name appropriate for the device, the computer 12 reads the corresponding saved flag location from the registry 16 and determines whether the current device is already registered. If unregistered, it is registered in the flag.

The operation of an application to be used with only video cameras and a specific example of the application will be described below with reference to the corresponding drawings. This application conforms to USB or IEEE 1394 standards and is an application having the function of loading a moving image into the computer, automatically applying an effect to the moving image, and outputting the resultant moving image.

First, an example of an application having the function of performing various kinds of processing on a moving image by loading this moving image into the computer 12 from a video camera capable of taking moving images will be introduced below.

(1) Connection form: a video camera provided with an interface conforming to USB, IEEE 1394 or the like is connected to the computer 12.

(2) At this time, a menu for an application is displayed. If the video camera was not connected in the past, an application for the video camera is added to and displayed in the menu. If the video camera has been connected once, the application for the video camera is already opened.

(3) Then, when the user selects the application for the video camera, the application for the video camera is activated.

Operations to be executed after the application for the video camera has been selected and activated will be described below with reference to FIG. 14.

First, when the application is activated, a screen 1 on which a start button is displayed and the contents of music setting, effect setting and output setting can be confirmed are activated. On this screen, "Music setting", "Effect setting" and "Output setting" can be changed. If the "START" button is clicked, the process can be made to proceed in accordance with an initial setting with the camera remaining connected.

Figure 14A:
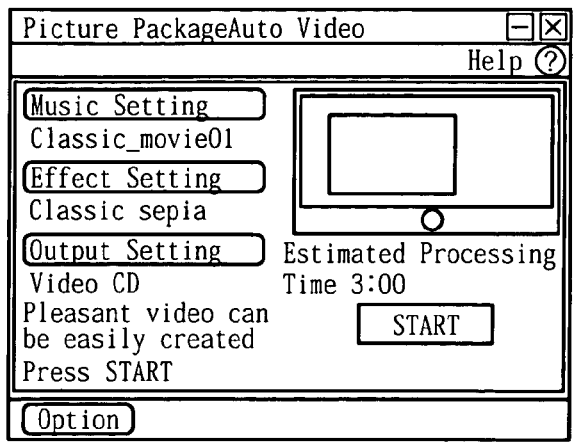
FIG. 14, consisting of FIG. 14A, 14B, 14C, 14D, 14E and FIG. 14F, is an explanatory view aiding in explaining the operation of an application to be used with only video cameras.
Figure 14B:
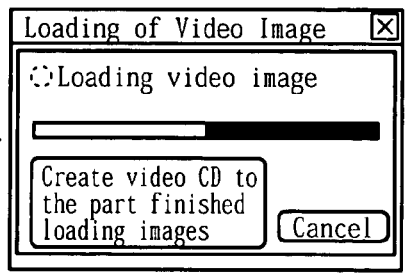
Figure 14C:
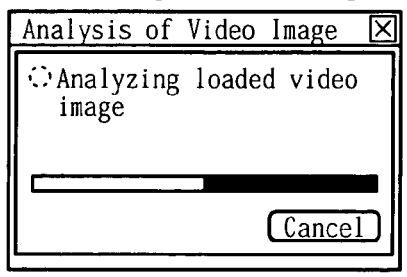
Figure 14D:
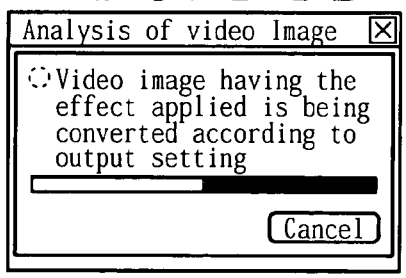
Figure 14E:
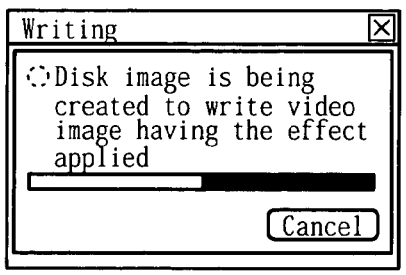
Figure 14F:
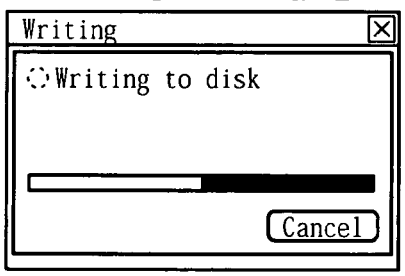
Figure 14G:
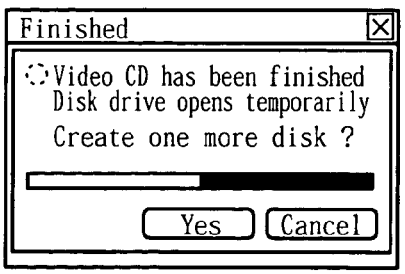

When the "START" button is clicked, the message "Loading video images" is displayed as shown on a screen 2 in FIG. 14B, and the loading of a video image is performed. Then, analysis of the loaded video image is performed, and the message "Analyzing loaded video images" is displayed as shown on a screen 3 in FIG. 14C. Then, the moving image that has undergone the loaded-image analysis is subjected to format conversion according to the output setting, and the message "Video image having the effect applied is being converted according to output setting" is displayed as shown on a screen 4 in FIG. 14D. Then, after the completion of the format conversion, if the video image is to be written to a video CD, a disk image of the video CD format is created, and the message "Disk image is being created to digitally write video image having the effect applied" is displayed as shown on a screen 5 in FIG. 14E. Then, the created disk image is actually written to a CD-R, and the message "Writing to disk" is displayed as shown on a screen 6 in FIG. 14F. Then, after the completion of writing to the CD-R, the message "Video CD has been finished. Disk drive opens temporarily. Create one more disk?" is displayed as shown on a screen 7 in FIG. 14G, as a screen for notice of completion. Thus, the sequence of processing comes to an end.

The possibility of industrial utilization with respect to the present invention is described hereinafter.

An application display apparatus is provided. Applications to be used respectively in a plurality of electronic devices are recorded on an information medium such as one CD-ROM. These applications are installed into a computer, and when the application display apparatus detects an electronic device connected to the computer, the application display apparatus displays on a menu list only an application corresponding to the detected electronic device. Accordingly, the application display apparatus can execute various functions related to a desired electronic device without recognizing the applications necessary for each individual identified electronic device, merely by installing attached applications into the computer.

What is claimed is:

1. An application display apparatus comprising:
 a connection terminal to which electronic devices having means for loading contents are connected, wherein the application display apparatus is an information device having a means for reproducing the contents stored in said electronic devices by installing applications stored in an information medium, wherein said information device comprises:
 means for detecting a connection to said electronic devices;
 means for generating a menu list including a first plurality of applications corresponding to a first of said electronic devices when connection to the first electronic device to said information device is detected, and automatically updating the menu list to include a second plurality of applications corresponding to a second of said electronic devices when connection to the second electronic device to said information device is detected, wherein the first and second plurality of applications correspond to operations respectively performed by the first and second electronic devices; and
 means for displaying the automatically updated menu list, such that the first and second plurality of applications respectively corresponding to the first and second electronic devices are contained in a single updated menu list, and for activating predetermined applications that are selected from said menu list to prompt performance of operations by the first and second electronic devices corresponding to the selected predetermined applications.

2. The application display apparatus according to claim 1, wherein detecting a connection to said electronic devices comprises memory means for storing and saving device information on said connected electronic devices.

3. The application display apparatus according to claim 2, wherein said memory means stores only device information on predetermined particular electronic devices.

4. The application display apparatus according to claim 3, wherein said predetermined particular electronic devices are changeable with other appropriate devices.

5. The application display apparatus according to claim 1, wherein said menu list includes a menu for activating an application corresponding to a previously detected electronic device on the basis of communication with said means for detecting a connection to said electronic devices.

6. The application display apparatus according to claim 1, wherein at least one of said electronic devices is an image pickup device.

7. An application display system comprising:
electronic devices respectively having means for loading contents; and
an information device having a means for reproducing the contents stored in said electronic devices by installing applications stored in an information medium, wherein said information device comprises:
means for detecting a connection to said electronic devices;
means for generating a menu list including a first plurality of applications corresponding to a first of said electronic devices when connection to the first electronic device to said information device is detected, and automatically updating the menu list to include a second plurality of applications corresponding to a second of said electronic devices when connection to the second electronic device to said information device is detected, wherein the first and second plurality of applications correspond to operations respectively performed by the first and second electronic devices; and
means for displaying the automatically updated menu list, such that the first and second plurality of applications respectively corresponding to the first and second electronic devices are contained in a single updated menu list, and for activating predetermined applications that are selected from said menu list to prompt performance of operations by the first and second electronic devices corresponding to the selected predetermined applications.

8. For use in a system including electronic devices that respectively load contents and an information device that reproduces the contents stored in said electronic devices by installing applications stored in an information medium, a method for displaying menu lists and activating applications, the method comprising:
detecting a connection to said electronic devices;
generating a menu list including a first plurality of applications corresponding to a first of said electronic devices when connection to the first electronic device to said information device is detected, and automatically updating the menu list to include a second plurality of applications corresponding to a second of said electronic devices when connection to the second electronic device to said information device is detected, wherein the first and second plurality of applications correspond to operations respectively performed by the first and second electronic devices; and
displaying the automatically updated menu list, such that the first and second plurality of applications respectively corresponding to the first and second electronic devices are contained in a single updated menu list, and activating predetermined applications that are selected from said menu list to prompt performance of operations by the first and second electronic devices corresponding to the selected predetermined applications.

9. The method according to claim 8, wherein detecting a connection to said electronic devices comprises accessing memory for storing and saving device information on said connected electronic devices.

10. The method according to claim 9, wherein said memory stores only device information on predetermined particular electronic devices.

11. The method according to claim 10, wherein said predetermined particular electronic devices are changeable with other appropriate devices.

12. The method according to claim 8, wherein said menu list includes a menu for activating an application corresponding to a previously detected electronic device on the basis of said detecting a connection to said electronic devices.

13. The method according to claim 8, wherein at least one of said electronic devices is an image pickup device.

14. A computer program product for displaying menu lists and activating applications in conjunction with a system including electronic devices that respectively load contents and an information device that reproduces the contents stored in said electronic devices by installing applications stored in an information medium, the computer program product stored on a computer readable medium and adapted to perform operations comprising:
detecting a connection to said electronic devices;
generating a menu list including a first plurality of applications corresponding to a first of said electronic devices when connection to the first electronic device to said information device is detected, and automatically updating the menu list to include a second plurality of applications corresponding to a second of said electronic devices when connection to the second electronic device to said information device is detected, wherein the first and second plurality of applications correspond to operations respectively performed by the first and second electronic devices; and
displaying the automatically updated menu list, such that the first and second plurality of applications respectively corresponding to the first and second electronic devices are contained in a single updated menu list, and activating predetermined applications that are selected from said menu list to prompt performance of an operations by the first and second electronic devices corresponding to the selected predetermined applications.

15. The computer program product according to claim 14, wherein detecting a connection to said electronic devices comprises accessing memory for storing and saving device information on said connected electronic devices.

16. The computer program product according to claim 15, wherein said memory stores only device information on predetermined particular electronic devices.

17. The computer program product according to claim 16, wherein said predetermined particular electronic devices are changeable with other appropriate devices.

18. The computer program product according to claim 14, wherein said menu list includes a menu for activating an application corresponding to a previously detected electronic device on the basis of detecting a connection to said electronic devices.

19. The computer program product according to claim 14, wherein at least one of said electronic devices is an image pickup device.

* * * * *